United States Patent [19]
Voss

[11] Patent Number: 5,845,671
[45] Date of Patent: Dec. 8, 1998

[54] PRESSURE DISCHARGING DRAIN PAN

[76] Inventor: Francis Voss, P.O. Box 338, Emerson, Nebr. 68733-0338

[21] Appl. No.: 871,863

[22] Filed: Jun. 9, 1997

[51] Int. Cl.$^6$ ....................................................... F04F 1/06
[52] U.S. Cl. ............................ 137/209; 184/1.5; 220/573
[58] Field of Search .............................. 137/209; 184/1.5; 220/573

[56] References Cited

U.S. PATENT DOCUMENTS

| | | | |
|---|---|---|---|
| 2,600,299 | 6/1952 | Johannes | 137/205 |
| 3,810,487 | 5/1974 | Cable et al. | 184/1.5 X |
| 4,114,644 | 9/1978 | Piper | 220/573 X |
| 4,420,023 | 12/1983 | Cislak | 184/1.5 X |

*Primary Examiner*—Gerald A. Michalsky

[57] ABSTRACT

An easily-emptied drain oil container for used motor oil. The oil is drained into a pan and then run into a container. Air pressure induced into the container closes the intake so that pressure in the container will force the oil from an exit tube into a disposal tank.

2 Claims, 2 Drawing Sheets

PRESSURE DISCHARGING DRAIN PAN

This invention pertains to devices for disposal of used motor oil, antifreeze and similar liquids, and more particularly to such a device designed to catch the liquid as it is drained from an engine and to be emptied into a large storage place for eventual recycling or other disposal.

Almost every engine used in an automotive device uses an oil supply normally contained in some sort of sump on the engine. From that sump, the oil is circulated through the engine for lubricating the various parts. As it is reused, the oil picks up impurities from the engine including moisture which tends to form sludge to the point where it will become necessary to replace the oil supply with a fresh supply. At that point, the oil is drained from the sump and must be disposed of. Similar problems exist in the use of anti-freeze coolants for most engines.

The disposal of the used fluids has become more of a problem as the number of engines has increased and as consciousness increases of the damage that such used liquids can cause. Therefore, it has become common to catch and reuse the liquid in some form.

In order to accumulate a reasonable supply of used oil or other liquid to make treatment feasible, it is necessary to gather and store the small amounts from each engine drained. However, it is also frequently inconvenient to drain the liquid directly into a larger tank or drum.

Therefore, by this invention, the applicant provides a relatively small, flat container readily movable to a point beneath the sump of an engine in which to catch the used oil, and a convenient system of pumping the oil from the container into a larger drum which will normally have an entrance somewhat above the bottom of the catchment. Similar treatment can be used for other liquids.

DESCRIPTION

Figure 1:
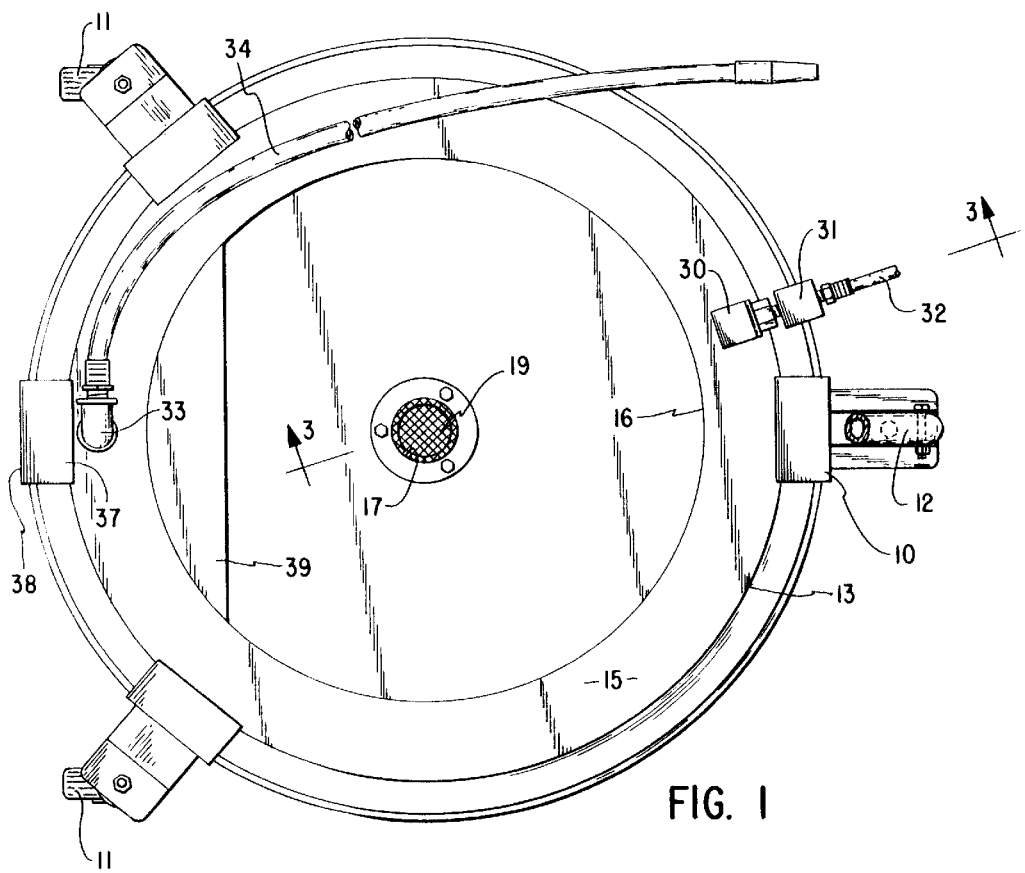
FIG. 1 is a top plan view of the catchment device for catching the draining liquid.

Briefly this invention comprises provision of a catchment basin adapted to catch used oil from the drainage of an oil sump on an automotive engine combined with an enclosure from which the used oil may be forced by compressed air into a hose for delivery to a storage device remote from and at a level above that of the enclosure. Although the description will relate to used oil, it will be apparent that the same device can be used for other liquids.

More specifically and referring to the drawings, the assembly is mounted on a series of brackets 10 and is supported by three castoring wheels 11. A handle 12 may be pivoted to each bracket 10 and be used to position the device beneath the drain plug of the engine being serviced (not shown).

An enclosed relatively flat tank 13 is mounted on the brackets 10 and has an upper wall 15 on which the catchment basin 16 is permanently fixed. An opening 17 extends through the bottom of the basin 16 and the top wall 15 of the tank 13 so that oil drained into the basin will fall into the tank. A screen 19 or similar filter is used to extend across the opening 17 to filter out larger particles of material which would make the used oil less useful because of added contamination.

Figure 3:
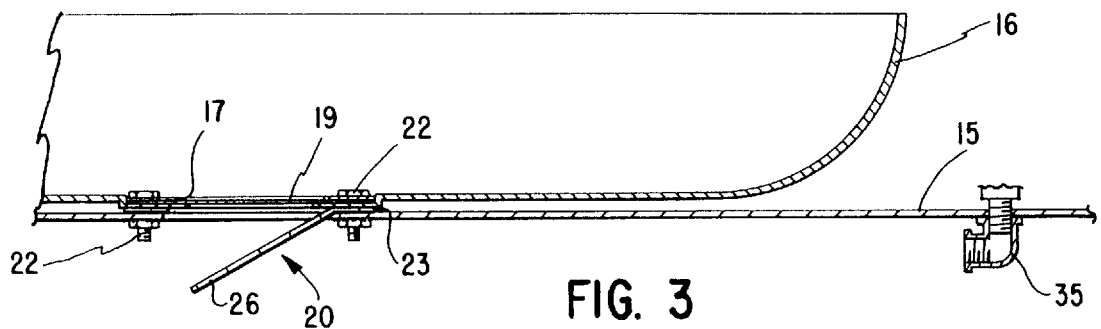
FIG. 3 is a sectional view from line 3—3 of FIG. 1 showing the pressurizing valve in an open position.
Figure 5:
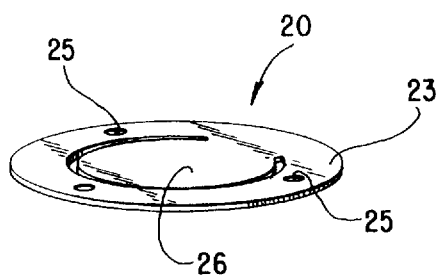
FIG. 5 is a perspective view of the valve shown in FIGS. 3 and 4.

A unique valve 20 is also used to close the opening 17 when desired. This valve is best shown in FIGS. 3 and 5 and is designed to be held in place between the basin 16 and the upper wall 15 of the tank. The preferred holding method is simply to run three or more bolts 22 through holes in the basin and tank wall and through the flange 23 of the valve 20. These same bolts may hold a clamping washer 24 against the screen 19 to hold it in place.

Figure 4:
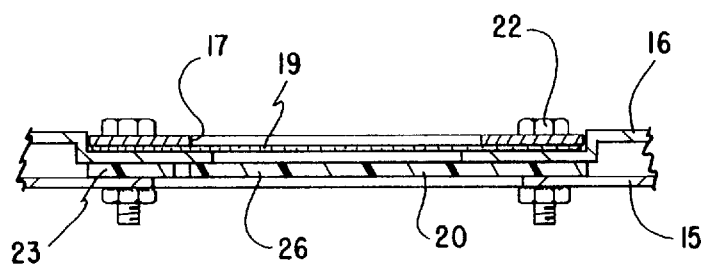
FIG. 4 is a partial view to an enlarged scale of the valve shown in FIG. 3 but in a closed position.

The valve 20 is formed of a flat sheet of a flexible, but oil impervious material such as synthetic rubber. As noted, it includes a flange 23 adapted to be clamped to the underside of the upper wall 15 of the tank. For that purpose, holes 25 pierce the material of the valve to allow passage of the bolts 22. A flap 26 is cut from the material. This flap is designed to seal against the rim of the opening 17 in the upper wall 15 of the tank when the valve is closed (see FIG. 4). It must also be flexible enough to drop open as shown in FIG. 3 so that normally the oil can drain from the basin 16 through the screen 19 and the open valve 20 into the tank 13. It is only when the tank 13 is to be emptied that the valve is closed.

Emptying the tank 13 is done by pressurizing the tank 13. Compressed air is introduced into the tank through a quick-exhaust fitting 30 of a type well known in the art. This fitting allows for exhausting air from the tank 13 as the fluid drains in. An air pressure regulator 31, also of a type well known, is used to control the pressure in the tank at no more than about 12 pounds per square inch for safety purposes. Also, for safety purposes, a pressure pop-off valve may be provided to avoid excess pressure from building up in the tank 13.

Figure 2:
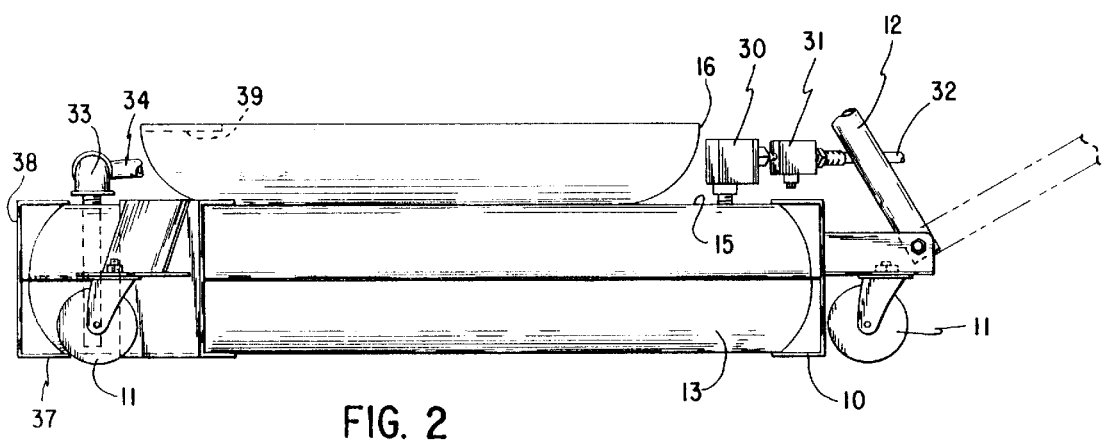
FIG. 2 is a side elevation view of the device of FIG. 1.

Pressure in the tank introduced through the fittings 30 and 31 from a source, not shown, is effective when the valve 20 is closed to force the liquid in the tank outwardly through the fitting 33 and hose 34 (FIGS. 1 and 2) from which the liquid may be drained into a large drum or tank (also not shown).

For easy operation, the air coming into the tank 13 from the elbow fitting 35 is directed exactly toward the bottom side of the open flap 26 (FIG. 3) so as to blow that flap upwardly while the increasing pressure inside the tank 13 causes the flap 26 to seal against the wall 15 of the tank and therefore to cause the pressure to rise to a point where the oil will be forced out of the tank. By impinging of the air stream onto the valve flap 26, enough motion of the flap is caused to provide for closing of the valve and successful operation of the device without further manual operation. It will be obvious that manual closure of the valve would also be possible but the self-closing feature is highly desired, to avoid mental lapse on the part of an operator. The arrangement illustrated is effective in most installations. However for heavier units, it might be desirable to use an extension on the fitting 35 to direct a stream of air more forcefully against the flap 26 to assure closing of that flap.

The entire device is built so that when it is not in use, it can be conveniently stored. As noted it is mounted on wheels 11 and is moved by a handle 12. Opposite the handle, a bracket 37 is provided. This bracket may be welded or brazed to the tank 13. The bracket 37 provides a flat surface 38 directly opposite the handle.

After use, when it is desired to store the device, it is only necessary to tip the tank so that it rests on the flat surface 38. By pushing the device next to a wall, the storage of the device is provided relatively conveniently.

A partial well 39 across what would be the lower edge of the basin 16 may be used to avoid spillage of residual oil or other liquid from the basin.

I claim as may invention:

1. An easily drained container for liquid comprising a tank having an upper wall, a catch basin fixed on said upper wall, said upper wall and said catch basin being formed to provide matching openings whereby material can flow from said basin into said tank, valve means for closing said opening mounted on said upper wall, said valve means including a flap adapted to close said openings between said basin and said tank, said flap having a normally open position in which said flap hangs downwardly from said upper wall, entry means on said tank for introducing compressed air into said tank said entry means including a fitting arranged to direct said compressed air into said tank against said flap in said open position whereby said flap will be impelled upward to close said opening and a discharge from said tank adapted to allow liquid contents of said tank to flow out of said tank as said compressed air flows into said tank.

2. An easily drained container comprising a catch basin, a tank device, means providing communication between said basin and said tank device so that liquid may drain from said basin into said tank device, means for pressurizing said tank device including a flap-type valve, located in said means for providing communication between said basin and said tank device, said valve including a flap hanging downward when open into the interior of said tank device when said valve is open, said means for pressurizing said tank device also including an inlet fitting for introducing compressed air into said tank device, said fitting being arranged to direct an air stream into said tank and against said flap when open to cause said flap to rise and therefore to close said valve.

* * * * *